Aug. 1, 1967    L. J. HONDZINSKI    3,333,291
AUTOMOBILE FLOOR MAT WASHER
Filed Oct. 6, 1966    5 Sheets-Sheet 1

INVENTOR.
Leonard J. Hondzinski
BY
Barnard, McGlynn & Reising
ATTORNEYS

Aug. 1, 1967     L. J. HONDZINSKI     3,333,291
AUTOMOBILE FLOOR MAT WASHER
Filed Oct. 6, 1966                5 Sheets-Sheet 4

INVENTOR.
Leonard J. Hondzinski
BY
Barnard, McGlynn & Reising
ATTORNEYS

INVENTOR.
Leonard J. Hondzinski

United States Patent Office 3,333,291
Patented Aug. 1, 1967

3,333,291
AUTOMOBILE FLOOR MAT WASHER
Leonard J. Hondzinski, 53299 Aulgur,
Rochester, Mich. 48063
Filed Oct. 6, 1966, Ser. No. 598,549
33 Claims. (Cl. 15—302)

ABSTRACT OF THE DISCLOSURE

An apparatus of the type utilized to wash automobile floor mats and the like and, more specifically, to a mat washer of the type wherein a folded mat may be removed from the washer on the same side that the mat is inserted into the washer and comprising means for moving the mat through the apparatus, means for spraying liquid on the mat, means for scrubbing the mat, means for drying the mat, and means for controlling the spray means and drying means as a mat moves through the apparatus.

---

This application is a continuation-in-part of copending application Ser. No. 429,708 filed Feb. 2, 1965, and now abandoned.

At present, there is no known satisfactory apparatus commercially available which is suitable for washing and drying automobile floor mats. Many automobiles are washed in automatic car washes which wash as many as three or four cars a minute. In such car washes, most of the equipment is automatic; yet there is no known machine utilizable to automatically wash the floor mats used in an automobile.

Typically, automobile floor mats are cleaned in such automatic car washes by the use of hot steam ejected from a manually operated nozzle. The mats are then hung to drip dry or manually dried with a cloth before being replaced in the automobile. Clearly, if automobiles are washed at the rate of one or more a minute, there is not sufficient time to dry the mats before it is necessary to replace them in the automobile.

The problem of replacing a wet floor mat in an automobile becomes particularly acute in the winter months. Often a mat covers a rug on the automobile floor and when a wet mat is replaced on the rug in the winter it may freeze to the rug which in turn damages the rug. If a wet mat is placed upon the rug in an automobile in the summer, it may cause molding or mildew between the mat and the rug to damage the rug. Furthermore, the placing of a wet mat in an automobile may induce the corrosion of the metal floor of the automobile.

The machines which are known in the prior art to be capable of cleaning sheet material are generally suited only for specific uses such as cleaning home floor rugs or sheets of glass or other specific materials. Known machines suitable for washing and drying sheet material are not satisfactory for use to wash automobile floor mats in an automobile service area, such as an automatic car wash, since such machines are typically very large, cumbersome and elongated and therefore not suited for use in the compacted areas utilized for washing automobiles. Normally, the inlet to the machine, or the place in which a sheet of material may be inserted into the machine, is at one end and the outlet, where the sheet of material may be removed from the machine, is at the other end of the machine. To wash a sheet of material in such machines, the operator, after inserting the sheet of material into the machine, must walk to the outlet end of the machine to retrieve the sheet of material, or two men are required to operate such machines. Furthermore, not all machines which are known to be capable of washing and scrubbing sheets of material utilize satisfactory drying means so that the sheet of material will be completely dry when it leaves the machine.

Some of the machines known to the prior art utilize control means for activating and deactivating the washing or scrubbing action in the machine as the sheet of material moves therethrough. Often such control means comprise electronic components to activate solenoids and the like. Although such electronic control means are satisfactory in some environments, they are too complex for use in an automobile floor mat washer since they are delicate and difficult to troubleshoot in case of a malfunction or breakdown. Other machines known in the prior art utilize hydraulic control systems to control valves and the like for activating the washing and scrubbing operation as a sheet of material moves through the machine. These hydraulic systems use an oil which is separate from the liquid which is utilized to wash a sheet of material in the machine. Such an hydraulic system requires careful sealing to prevent the hydraulic oil from mixing with the washing liquid and are expensive.

Frequently, the control system utilized in the machines known in the prior art are cycled upon the entry of a sheet of material into the machine so that the machine goes through a complete cycle of washing, scrubbing and drying as a sheet of material moves therethrough, and then shuts down. In such a control system, the insertion of a sheet of material into the machine begins the sequence of operations to scrub, wash and dry the sheet of material, and the next sequence cannot start until the first sequence has ended. The spacing of the sheets of material through the machine is, therefore, controlled by the length of time required for the sequence of operation of the control system of the machine.

Accordingly, it is an object and general feature of the present invention to provide an automatic automobile floor mat washer comprising a combination of elements and components associated in such a manner that a floor mat may be inserted into the washer and removed in a folded position from the same side of the washer.

It is another object and general feature of this invention to provide an automatic automobile floor mat washer utilizing a control system for activating and deactivating the washing, scrubbing and drying of the floor mat as it passes through the washer, which control system is unique and simple in construction and utilizes the washing liquid for hydraulic actuation of the control components.

Yet another object and general feature of the present invention is to provide an automatic automobile floor mat washer utilizing a control system for activating and deactivating the washing, scrubbing and drying of the mat as the mat passes through the washer in such a manner that a plurality of mats may be inserted into the washer in a manner such that the washing, scrubbing and drying operations will not be deactivated so long as serially arranged mats are being inserted into the washer one after the other.

Still another object and general feature of the present invention is to provide an automatic automobile floor mat washing machine including means for moving a mat through the machine, means for spraying a liquid on the mat as it passes through the machine, means for scrubbing the mat as it passes through the machine, means for drying the mat as it moves through the machine, and hydraulic control means utilizing the washing liquid to activate the spraying means for a predetermined period from the time the mat enters the machine and for activating the drying means for a predetermined time after the mat enters the machine so that upon the insertion of serially arranged spaced mats one after another into the machine, the spraying and drying means will continue to function.

In general, these and other objects may be attained by an apparatus constructed in accordance with the instant invention including a housing, a first, second, and third pair of rollers mounted in the housing so that one of the rollers of each pair of rollers is movable away from the other roller of each respective pair, a drive means mounted in the housing for rotatably driving the respective non-movable roller of each pair of rollers, means for guiding a mat from the first pair of rollers to the second pair of rollers and from the second pair of rollers to the third pair of rollers and from the third pair of rollers to a folded position in a depository. The apparatus also includes a spray means and a scrubbing means for respectively spraying a liquid on the mat and scrubbing the mat as it passes between the first and second pair of rollers. Also included is a drying means for blowing air against the mat as it passes from the second pair of rollers to the third pair of rollers. In addition, there is a control means comprising a liquid-operated pilot valve having open and closed positions for allowing liquid to flow from a source to the spray means when in the open position. Also included in the control means is a liquid-operated means for activating the drying means. The apparatus includes a valve means which is moved to an open position by the movable roller of the first pair of rollers when a mat passes between the first pair of rollers to supply liquid from the source to open the pilot valve and to the liquid-operated means to activate the drying means.

Other objects and attendant advantages of this invention will be readily appreciated as the same becomes better understood by reference to the following detailed description when considered in connection with the accompanying drawings wherein.

Referring now to the drawings wherein like numerals indicate like or corresponding parts throughout the several views, there is shown, generally at 10, an automatic automobile floor mat washing machine. The machine has a housing 12 which is suitably supported by an appropriate means such as the legs 14. The housing has an inlet 16 for receiving a mat, such as the mat shown in phantom in FIGURE 1, and an outlet 18 for removing a mat from the machine. It is important to note that the inlet 16 and the outlet 18 are on the same side 20 of the machine so that an operator may insert a mat into the inlet 16 and remove the mat from the outlet 18 while remaining in substantially the same position.

Figure 1:
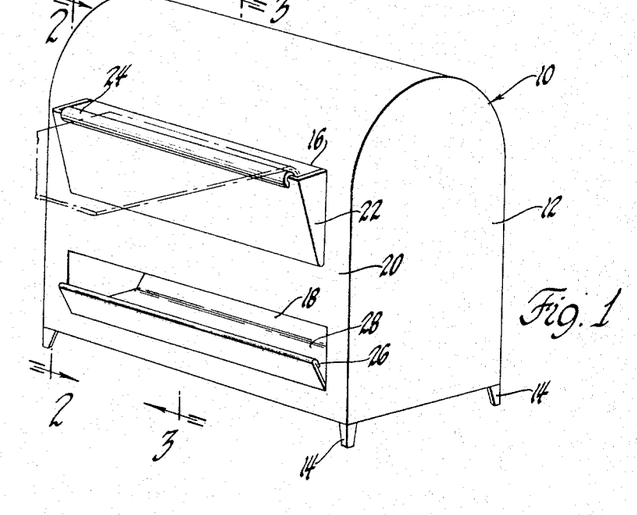
FIGURE 1 is a perspective view of an automatic automobile floor mat washing machine constructed in accordance with the instant invention.

Any appropriate means may be utilized for guiding a mat into the inlet 16; however, there is illustrated a chute 22 attached to the inlet 16. On the upper and outer edge of the chute 22 there is disposed a roller 24 to accommodate the movement of a mat into the inlet 16. A flange or lip 26 is attached to the outlet 18 to prevent a mat from inadvertently coming out of the outlet 18.

As has been hereinbefore set forth, the instant apparatus for washing automobile floor mats comprises a means for moving a mat through the apparatus, a means for guiding a mat through the apparatus, spray means for spraying liquid on the mat, scrub means for scrubbing a mat, drying means for drying a mat, and control means for allowing fluid to flow through the spray means and for activating the drying means.

Figure 3:
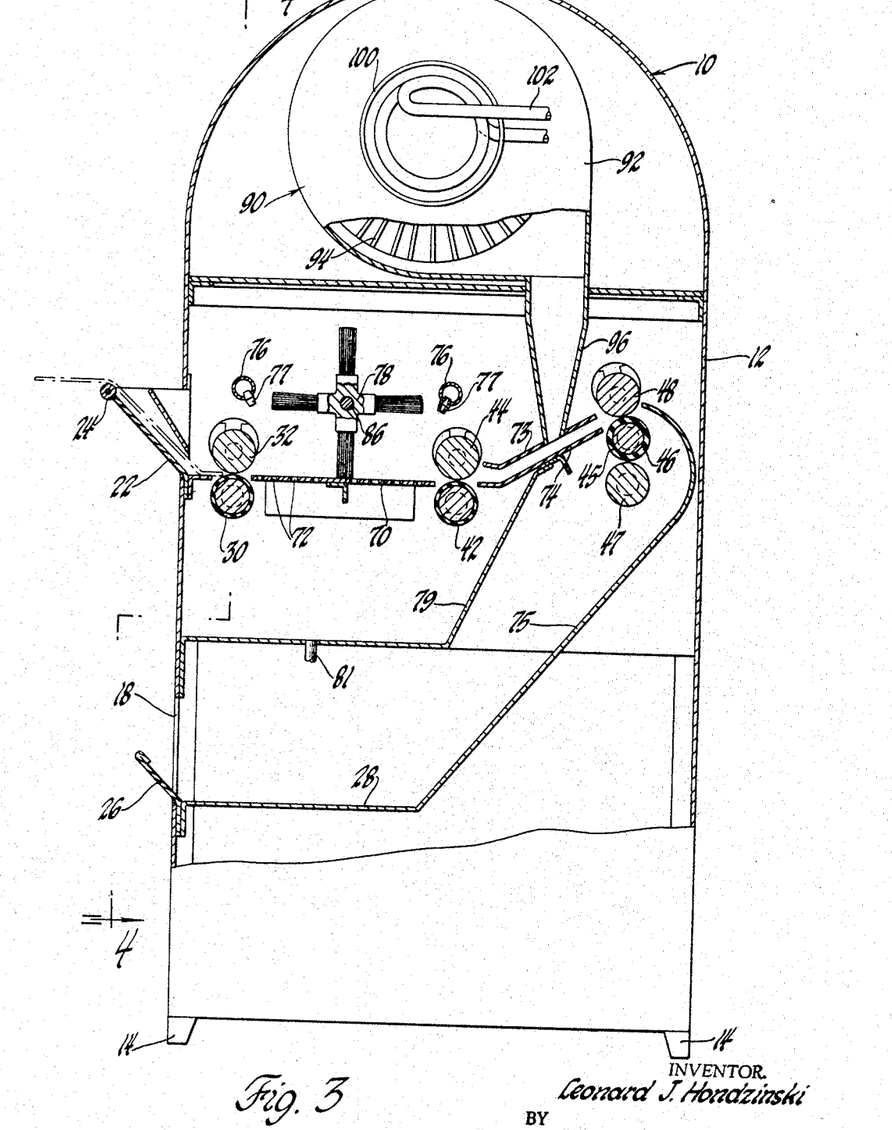
FIGURE 3 is an enlarged cross-sectional view taken along line 3—3 of FIGURE 1.

The means for moving a mat through the apparatus includes three pairs of rollers with each pair of rollers mounted in the housing 12 for rotational contact with one another. One of the rollers of each pair is movable away from the other roller of each pair as a mat moves therebetween. The first pair of rollers includes the roller 30 rotatably mounted at each end in the housing 12 and a second roller 32 rotatably mounted at each end in the housing 12 for rotational contact therealong with the first roller 30 so as to rotate therewith. The second roller 32 is mounted in the housing such that it may move away from the first roller 30 as a mat passes therebetween and toward the roller 30 when a mat leaves the rollers 30 and 32.

Figure 2:
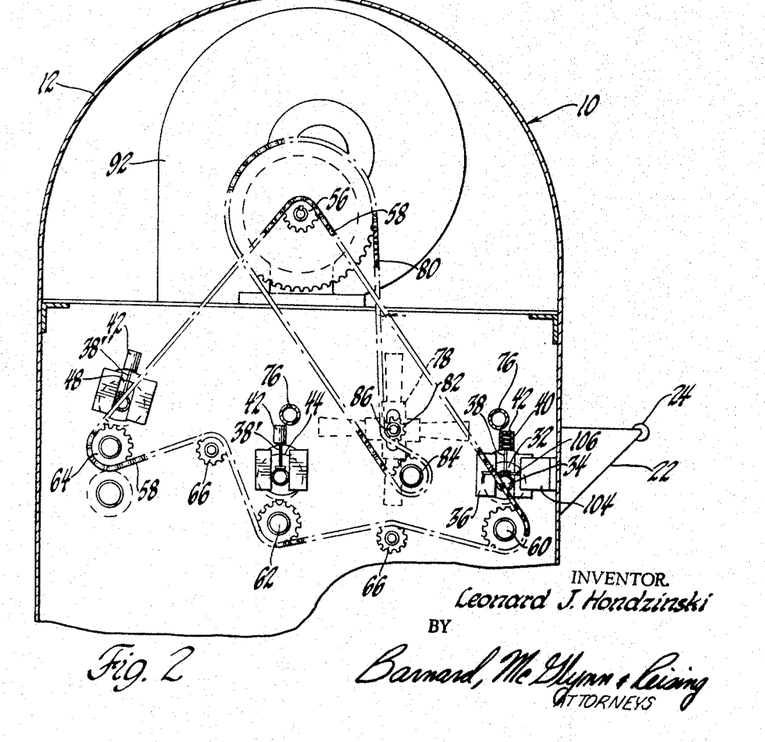
FIGURE 2 is an enlarged end view taken along line 2—2 of FIGURE 1 with the member forming the end of the housing of the machine cut away.

The roller 32 has an axle or shaft 34 which rides between the two blocks 36, more clearly shown in FIGURE 2. The axle 34 may move along the blocks 36 so that the roller 32 may move toward and away from the roller 30. The roller 32 is biased toward the roller 30 by an appropriate means, such as by the spring biased rod 38 which urges the axle 34 toward the roller 30. The rod 38 acts upon the axle 34 at one end and is acted upon by the spring 40 in the casing 42 at the other end. The casing 42 is attached to the housing 12 by welding, bolts or the like.

A second pair of rollers includes a third roller 42 rotatably mounted at each end in the housing 12 and a fourth roller 44 rotatably mounted at each end in the housing 12 for rotational contact therealong with the roller 42 so as to rotate with the roller 42. The roller 44 is mounted in the same manner as the roller 32 so that it may move toward and away from the roller 42 to allow a mat to pass between the rollers 42 and 44. The roller 44 is likewise biased toward the roller 42 by an appropriate means such as the spring biased rod 38'.

The third pair of rollers includes a fifth roller 46 rotatably mounted at each end in the housing 12 and a sixth roller 48 rotatably mounted at each end in the housing 12 for rotational contact therealong with the roller 46. The sixth roller 48 is mounted in the same manner that rollers 32 and 44 are mounted so that it is movable toward and away from the roller 46 to allow a mat to move between the third pair of rollers. The roller 48 is also biased toward the roller 46 by an appropriate means such as the spring biased rod 38".

The rollers 30 and 42 are shown as having a coating which is preferably rough so that there is a high amount of frictional contact to prevent slippage of the mat relative to the rollers as it is moved through the machine.

The roller 46 of the third pair of rollers has a liquid absorbing material 45 thereabout. The material 45 is a sponge-like material. A squeegee roller 47 is rotatably mounted in the housing 12 for rotational contact therealong with the roller 46. The roller 47 compresses the liquid absorbing material 45 to force liquid that has been absorbed from the mat as it passes between the rollers 46 and 48 from the liquid absorbing material 45.

Figure 4:
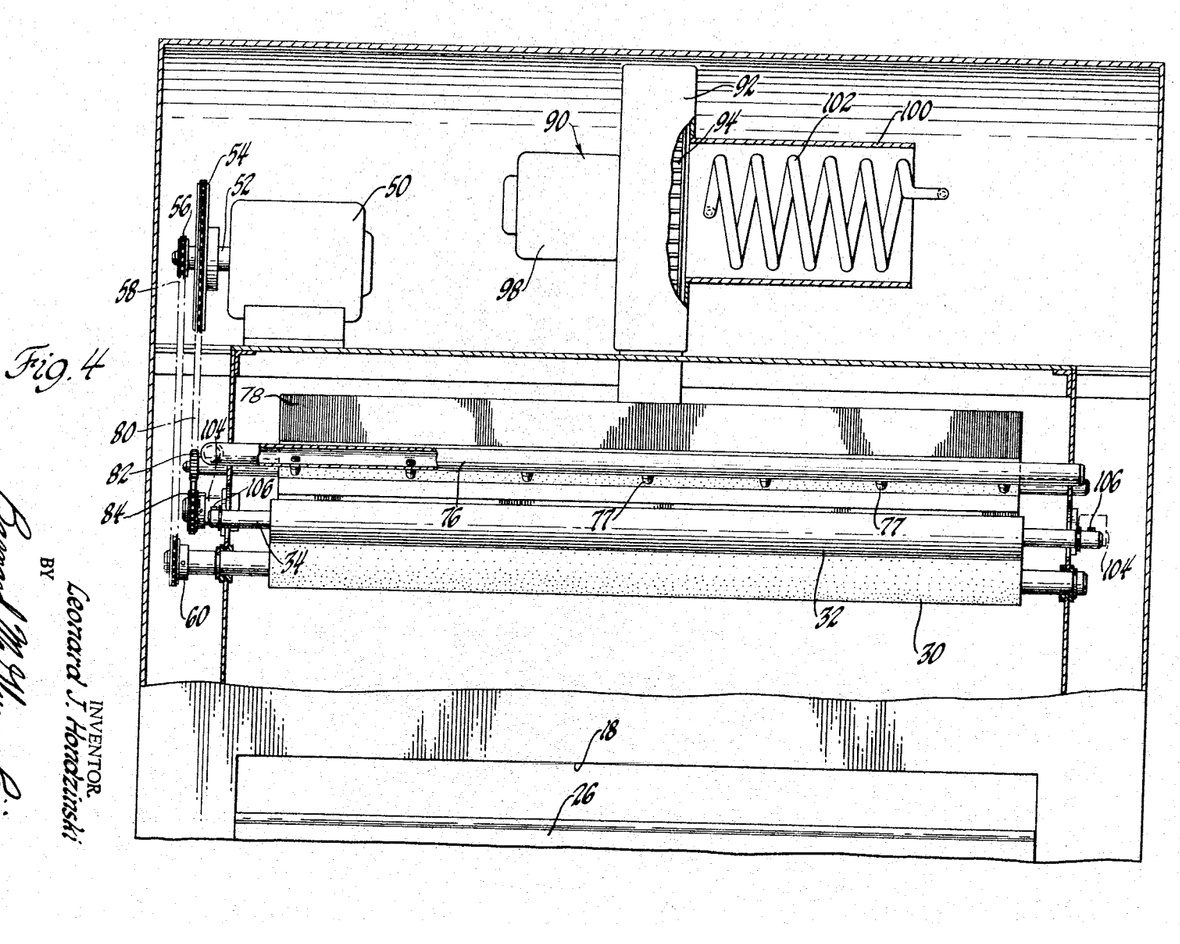
FIGURE 4 is a cross-sectional view taken along line 4—4 of FIGURE 3.

Also included is a drive means comprising an electric motor 50 mounted in the housing 12 to rotatably drive the non-movable rollers 30, 42 and 46 of each respective pair of rollers. The motor 50 has a shaft 52 extending therefrom with a large sprocket 54 and a small sprocket 56 secured thereto. The small sprocket 56 drives a chain 58. The roller 30 has a sprocket 60 connected thereto, the roller 42 has a sprocket 62 connected thereto, and the roller 46 has a sprocket 64 connected thereto. The chain 58 passes over the sprockets 60, 62 and 64 to rotate the rollers 30, 42 and 46 respectively. The idler sprockets 66 are not necessary but are provided to assure sufficient contact between the chain 58 and each of the respective sprockets 60, 62 and 64. Therefore, one of the rollers of each pair of rollers is immovable relative to the housing 12 and is driven through the chain 58 by the electric motor 50. The other of the rollers of each respective pair is movable toward and away from the driven roller and is rotated by the driven roller.

The means for guiding a mat through the apparatus includes a perforated surface 70 extending from the rollers 30 and 32 to the rollers 42 and 44. The surface 70 has perforations or holes 72 to allow liquid to pass therethrough. Also included are surfaces 73 and 74 which are inclined upward from the second pair of rollers 42 and 44 to the third pair of rollers 46 and 48. As the mat moves up the inclined surface 74, the liquid is drained off the mat due to gravity and due to air being passed over the mat from the blower, which is more fully described hereinafter.

The apparatus also includes a depository 28 and a surface 75 disposed between the third pair of rollers 46 and 48 and the depository 28 for guiding a mat from the third pair of rollers 46 and 48 to the depository 28 so that a mat of a predetermined length will fold back and forth upon itself in the depository 28. There are various sizes of floor mats used in automobiles. Some extend from one side of the automobile to the other and others merely occupy a small space on the floor on one side of the automobile. Such small mats do not need to be folded since they will easily fit in the depository 28. However, long mats will not fit in the depository 28; therefore, the surface 75 is angled in such a manner that when the leading edge of the mat enters the depository, it folds under so that the mat folds back and forth upon itself. An operator may then easily reach into the outlet 18 to withdraw a mat from the depository 28.

The spray means for spraying a liquid on the mat as it passes over the perforated surface 70 includes a pair of spray tubes 76. One of the spray tubes 76 is mounted within the housing adjacent the first pair of rollers 30 and 32 and the other spray tube 76 is mounted in the housing adjacent the second pair of rollers 42 and 44. The spray tubes have a series of nozzles 77 for spraying the liquid on a mat as it passes over the perforated surface 70.

The housing 12 also supports the surface 79 so that a tank is formed beneath the perforated surface 70 for catching the liquid passing through the perforations 72. The drain means comprising the pipe 81 is attached to the tank so that liquid may be drained from the tank to an appropriate sewer or the like.

The scrub means includes an elongated rotary brush 78 mounted in the housing between the first pair of rollers 30 and 32 and the second pair of rollers 42 and 44. The elongated rotary scrub brush 78 is mounted adjacent the perforated surface 70 for scrubbing a mat as it is being sprayed with a liquid and passes over the surface 70. The brush 78 may be made of any suitable material such as nylon and may be rotated in either direction; however, it has been found suitable to rotate the brush 78 in such a direction to aid the movement of a mat from the rollers 30 and 32 to the rollers 42 and 40.

There is also included means for operatively connecting the scrub brush 78 to the motor 50 so that the scrub brush 78 is rotated. This means includes the sprocket 54, a chain 80 and sprocket 82 connected to the shaft 86 of the rotary brush 78. An idler sprocket 84 may also be provided so that the brush 78 is rotated in the desired direction.

The drying means is mounted in the housing 12 for drying a mat as it passes over the inclined surface 74. The drying means includes a blower, generally shown at 90, for blowing air onto the mat. The blower has a housing 92 which surrounds an impeller 94. The housing 92 is formed so that it has a spout 96 for directing air onto the mat as it passes over the inclined surface 74. The impeller 94 is rotatably driven by a motor 98.

The apparatus illustrated also includes a means for heating and dehydrating air before it is utilized to dry a mat. The means for heating and dehydrating air includes an air inlet passage 100 attached to the blower housing 92 and a liquid passage taking the form of a coil of tubing 102 disposed in the inlet passage. The tubing 102 is in fluid communication with a source of heated liquid by any appropriate means such as a hose, copper tubing, or the like. It has been found preferable to utilize water at a temperature between 120° F. and 140° F. As will become more clear hereinafter, the flow of liquid to the spray tubes 76 is regulated by a control means; however, as the liquid is flowing from the source to the spray tubes 76, it passes through the tubing 102 so that the air that is moved through the inlet 100 to the blower 90 will be heated and dehydrated so that it is a more efficient drying medium. The heating and dehydrating means can be a very significant factor in adequately drying the floor mats, especially when the apparatus is used in an environment wherein the air is cold and humid.

Figure 5:
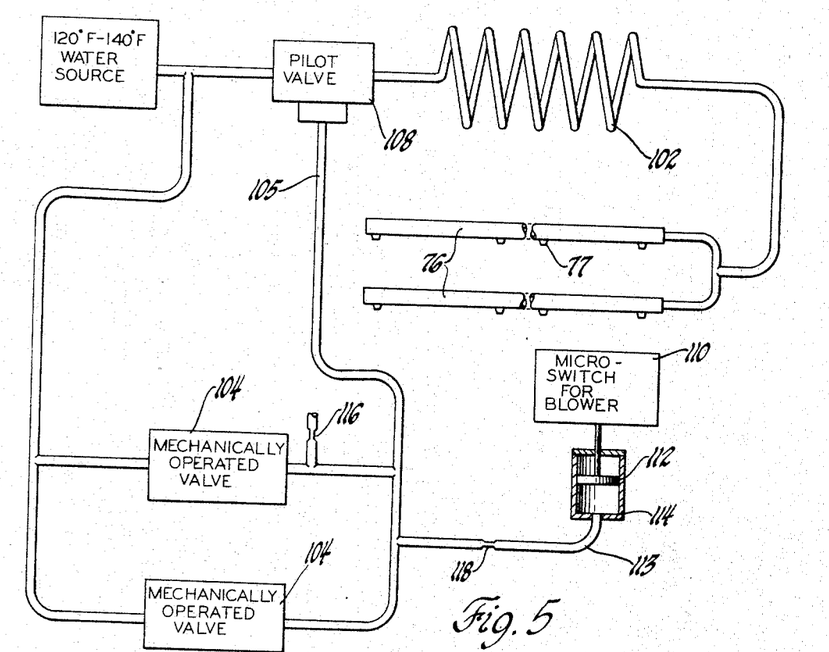
FIGURE 5 is a schematic view showing the spray means and the hydraulic control system of the machine.

As alluded to previously, the apparatus also includes control means for allowing liquid from the source to be sprayed by the spray tubes 76 when a mat first contacts the first pair of rollers 30 and 32. The control means allows liquid to be sprayed through the spray tubes 76 for a predetermined period after the mat has first contacted the first pair of rollers 30 and 32. Furthermore, the control means activates the blower when the mat first contacts the first pair of rollers 30 and 32 and maintains the blower in operation for a predetermined period of time after the mat first contacts the rollers 30 and 32. Furthermore, the control system functions so that upon the insertion of mats into the apparatus at intervals less than the predetermined period of operation of the spraying tubes 76 or the predetermined period of operation of the blower, the liquid will be continually sprayed and the blower will be continually operated so long as mats are inserted into the apparatus at such intervals or at shorter intervals.

The heart of the control means is a valve means including the valves 104 disposed at each respective end of the roller 32. Each valve 104 has an actuating arm 106 which contacts the axle 34 of the roller 32 so that when either end of the roller 32 moves away from the roller 30, the valve 104 at the end which moves away from the roller 30 will be actuated to allow liquid from the source to pass therethrough. A liquid-operated pilot valve 108 is included and has open and closed positions for allowing liquid to flow from the source to the spray tubes 76 when in the open position. The pilot valve 108 is normally closed and is moved to the open position by liquid supplied through either of the valves 104 and line 105. Therefore, when either end or both ends of the roller 32 move away from the roller 30, as when a mat is passing therebetween, liquid from the source flows through one or both of the valves 104 to actuate the pilot-operated valve 108, which in turn allows liquid from the source to flow through the tubing 102 to the spray nozzles 77.

The control system also includes a liquid-operated means for actuating the blower 98. The blower motor 98 is activated by a microswitch 110 which is activated by the piston 112. The piston 112 is disposed in the cylinder 114 and is moved in the cylinder 114 by liquid passing through line 113 from either of the valves 104.

Liquid continues to flow from the source to the nozzles 77 through the pilot-operated valve 108 a predetermined time after a mat has passed between the rollers 30 and 32 due to the orifice 116. After a mat has passed between the rollers 30 and 32, the valves 104 close trapping liquid in the line 105 between the valves 104 and the pilot-operated valve 108. The liquid thus trapped is slowly bled off through the orificed liquid outlet 116 so as to hold the pilot valve in the open position a predetermined period of time after the valves 104 have moved to the closed position.

The blower remains in operation a predetermined period after the valves 104 close due to the orifice 118. The orifice 118 reduces liquid flow from the cylinder 114 to the orifice outlet 116 when the valves 104 are closed so that the piston 112 engages the microswitch for a predetermined time after the valves 104 have closed.

Figure 6:
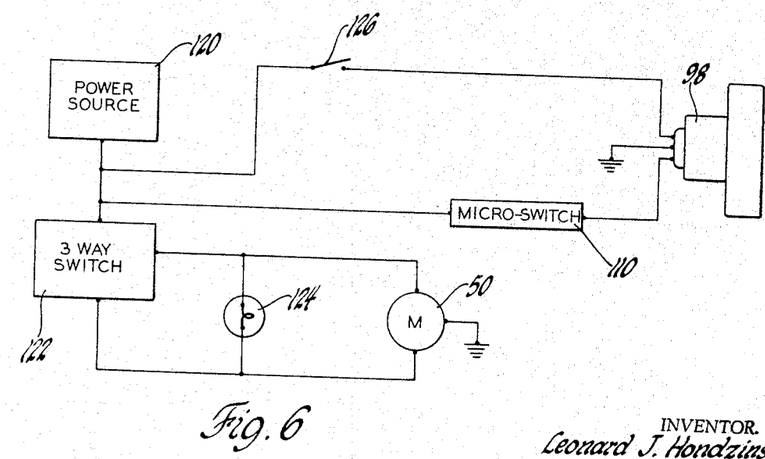
FIGURE 6 is a schematic view showing the electrical system of the machine.

The electrical system for the apparatus is illustrated in FIGURE 6. There is an appropriate power source 120 to supply electrical power to a three-way switch 122. The three-way switch may be turned to a first position to rotate the motor 50 in one direction. However, it is sometimes desirous that the rollers and the scrub brush be rotated in the opposite direction in the event a mat is entangled in the apparatus. Therefore, the switch 122 may be moved to a second position to supply electrical voltage to the motor 50 so that the motor will rotate in the opposite direction. A light 124 is provided to indicate when the electrical switch is in either of the on positions. Power is supplied to the blower motor 98 when the microswitch 110 is closed; however, it is often advantageous to operate the blower motor 98 continually. For continued operation of the blower 98, a manual switch 126 is provided so that power may be supplied to the motor 98 regardless of the position of the microswitch 110.

Figure 7:
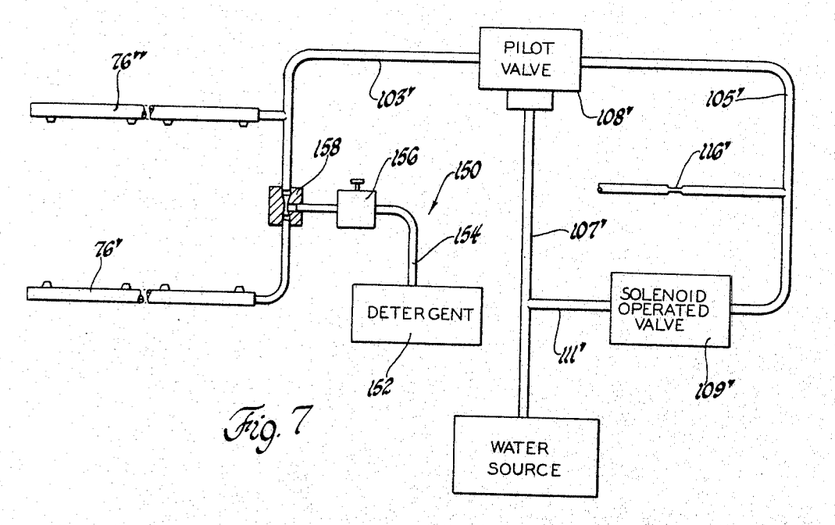
FIGURE 7 is a schematic view showing an alternative embodiment of the spray means in combination with an alternative control system.
Figure 8:
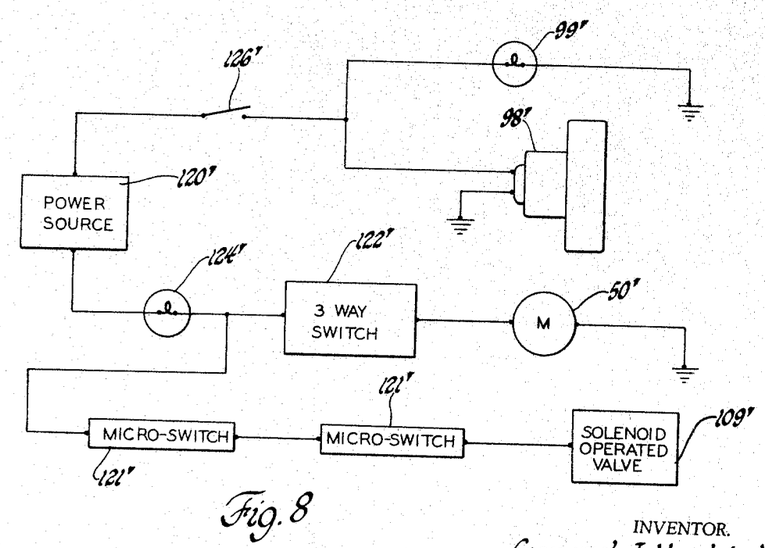
FIGURE 8 is a schematic view showing an alternative embodiment of the electrical system of the machine.

An alternative embodiment of the control means, which allows liquid from the source to be sprayed by the spray means when a mat first contracts the means for moving the mat and which activates the drying means, is illustrated in FIGURES 7 and 8. There is included a source of liquid, a pilot-operated valve 108′, and a solenoid operated valve 109′. Liquid from the source passes through the line 107′ to the pilot valve 103′. Liquid from the source also flows through line 111′ to the solenoid operated valve 109′. Liquid passes from the source through the pilot valve 108′ and through the line 103′ to the first spray tube 76′ and to the second spray tube 76″. The pilot-operated valve 108′ has open and closed positions for allowing liquid to flow from the source to the spray tubes 76′ and 76″ when in the open position. The solenoid operated valve 109′ has open and closed positions to allow liquid to flow from the source through line 111′ and through line 105′ to open the pilot-operated valve 108′ when the solenoid operated valve 109′ is in the open position.

The control means illustrated in FIGURES 7 and 8 also includes an electrical power source 120′, a first switch 122′, and the switch means 121′. The first switch 126′ is preferably a manually operated switch having open and closed positions for activating the blower motor 98′ when in the closed position. The light 99′ indicates power is being supplied through the switch 126′ to the blower motor 98′. The switch means 121′ comprises a pair of micro-switches which are positioned adjacent each end of the movable roller 32 of the first pair of rollers in place of the valves 104 of the control means previously described. Thus, when a mat passes between the first pair of rollers 30 and 32, the micro-switches 121′ are closed to send power to the solenoid operated valve 109 for actuating the solenoid operated valve 109 to the open position. The three-way switch 122′ is similar to the three-way switch 122 previously described and supplies power to the motor 50′ of the drive means for rotating the various rollers and the scrubbing means 78. The indicator light 124′ indicates that power is being supplied to the three-way switch and to the switching means 121′.

In operation, the three-way switch 122′ is moved to a position to supply power to the motor 50 and the switch 126′ is moved to the closed position to supply power to the blower motor 98′. When a mat is inserted into the apparatus and moves between the first pair of rollers 30 and 32 the micro-switches 121 are closed to supply electrical power to the solenoid operated valve 109′.

When the solenoid operated valve 109′ is thus supplied power, it moves to the open position allowing liquid to pass through the lines 111′ and 105′ to the pilot-operated valve 108′ to move the pilot-operated valve 108′ to the open position. With the pilot-operated valve 108′ in the open position, liquid flows through the line 107′ through the pilot-operated valve 108′ and through the line 103′ to the tubes 76′ and 76″. The orificed liquid outlet 116′ bleeds liquid from the line 105′ so that the pilot-operated valve 108′ remains open a predetermined period after a mat contacts the first pair of rollers 30 and 32′, i.e., a predetermined period of time after the solenoid operated valve 109′ moves to the closed position.

The first spray tube 76′ is disposed upstream of the means 78 for scrubbing a mat, i.e., adjacent the first pair of rollers 30 and 32, and the second spray tube 76″ is disposed downstream of the means 78 for scrubbing a mat, i.e., adjacent the second pair of rollers 42 and 44. There is also included detergent means generally shown at 150 and in communication with the first spray tube 76′ for adding detergent to the liquid sprayed on a mat upstream of the means 78 for scrubbing a mat. More specifically, the detergent means includes a source of detergent 152, line 154, valve 156, and the venturi 158. Liquid flowing through the line 103′ flows through the venturi 158 as it flows to the first spray tube 76′. As the liquid flows through the venturi 158, the detergent is drawn into the flow stream at the venturi and added to the liquid flowing to the first spray tube 76′. The valve 156 is a metering valve which may be adjusted to vary the amount of detergent flowing to the venturi 158.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An apparatus of the type utilized to wash automobile floor mats comprising: means for moving a mat through said apparatus; spray means mounted in said apparatus for spraying a liquid on a mat as it passes through said apparatus; means mounted in said apparatus adjacent said spray means for scrubbing a mat; drying means mounted in said apparatus for drying a mat after the mat has been sprayed and scrubbed; a source of liquid; and control means for allowing a liquid from said source to be sprayed by said spray means when a mat first contacts said means for moving a mat and for a first predetermined period of time thereafter, and for activating said drying means when a mat first contacts said means for moving a mat so that said drying means remains activated for a second predetermined period thereafter whereupon the insertion of mats into said apparatus at intervals less than said first or second predetermined periods will allow liquid to be continually sprayed from said spray means and allow said drying means to remain activated.

2. An apparatus of the type utilized to wash automobile floor mats comprising: means for moving a mat through said apparatus; spray means for spraying a liquid on a mat as it passes through said apparatus; means mounted in said apparatus adjacent said spray means for scrubbing a mat; drying means mounted in said apparatus for drying a mat with air after said mat has been sprayed and scrubbed; means for heating and dehydrating said air before said air contacts a mat; a source of liquid; and control means for allowing a liquid from said source to be sprayed by said spray means when a mat first contacts said means for moving a mat and for a first predetermined period of time thereafter and for activating said drying means when a mat first contacts said means for moving a mat so that said drying means remains activated for a second predetermined period thereafter.

3. An apparatus of the type utilized to wash automobile floor mats comprising: means for moving a mat through said apparatus; spray means mounted in said apparatus for spraying a liquid on a mat as it passes through said apparatus; means mounted in said apparatus adjacent said spray means for scrubbing a mat; drying means mounted in said apparatus for drying a mat after said mat has been scrubbed; a source of liquid; control means for allowing a liquid from said source to be sprayed by said spray means when a mat first contacts said means for moving a mat and for a first predetermined period of time thereafter and for activating said drying means when a mat first contacts said means for moving a mat so that said drying means remains activated for a second predetermined period thereafter; and means for receiving and guiding a mat after the mat leaves said drying means so that a mat of predetermined length will fold back and forth upon itself in a static condition in the apparatus.

4. An apparatus of the type utilized to wash automobile floor mats comprising; means for moving a mat through said apparatus; spray means mounted in said apparatus for spraying a liquid on a mat as it passes through said apparatus; means mounted in said apparatus adjacent said spray means for scrubbing a mat; drying means mounted in said apparatus for drying a mat after said mat has been sprayed and scrubbed; a source of liquid; control means for allowing a liquid from said source to be sprayed by said spray means when a mat first contacts said means for moving a mat and for a first predetermined period of time thereafter and for activating said drying means when a mat first contacts said means for moving a mat so that said drying means remains activated for a second predetermined period thereafter, said apparatus having an inlet for receiving a mat and an outlet for removing a mat therefrom; and said inlet and said outlet being disposed on the same side of said apparatus so that an operator may insert a mat into the apparatus and remove a mat from the apparatus while remaining in substantially the same position.

5. An apparatus of the type utilized to wash automobile floor mats comprising: a housing; means for moving a mat through said housing including, a first pair of rollers mounted in said housing for rotational contact with one another and one of said rollers being movable away from the other as a mat is moved therebetween, a second pair of rollers mounted in said housing for rotational contact with one another and one of said rollers being movable away from the other as a mat is moved therebetween, a third pair of rollers mounted in said housing for rotational contact with one another and one of said rollers being movable away from the other as a mat is moved therebetween, a drive means mounted in said housing for rotatably driving the respective non-movable rollers of each of said pairs of rollers, means for guiding a mat from said first pair of rollers to said second pair of rollers and from said second pair of rollers to said third pair of rollers; spray means mounted in said housing for spraying a liquid on a mat as it passes from said first pair of rollers to said second pair of rollers; scrubbing means mounted in said housing between said first and second pair of rollers for scrubbing a mat; means operatively connecting said scrub means to said drive means; drying means mounted in said housing for drying a mat with air as it passes from said second pair of rollers to said third pair of rollers; a source of liquid; and control means for allowing a liquid to be sprayed by said spray means when a mat passes between said first pair of rollers and for a first predetermined period of time after a mat leaves said first pair of rollers, and for activating said drying means when a mat passes between said first pair of rollers to maintain said drying means activated for a second predetermined period of time after a mat leaves said first pair of rollers.

6. An apparatus as set forth in claim 5 including; a depository, and means disposed between said third pair of rollers and said depository for guiding a mat to said depository so that a mat of predetermined length will fold back and forth upon itself in said depository.

7. An apparatus as set forth in claim 6 wherein; said housing has an inlet for placing a mat in position to contact said first pair of rollers, said housing having an outlet depository, and said inlet and said outlet being positioned on the same side of said housing.

8. An apparatus as set forth in claim 5 including means for heating and dehydrating air as it passes to said drying means.

9. An apparatus as set forth in claim 8 wherein said means for heating and dehydrating air includes; an air inlet for said drying means, a liquid passage disposed in said inlet, said source of liquid being heated, and said source being in communication with said spray means so that liquid flows from said source through said liquid passage to said spray means so that air passing to said drying means will be heated and dehydrated.

10. An apparatus as set forth in claim 5 wherein; said non-movable roller of said third pair of rollers has a liquid absorbing material thereabout.

11. An apparatus as set forth in claim 10 including; a squeegee roller rotatably mounted in said housing for rotational contact therealong with said non-movable roller of said third pair of rollers for compressing said liquid absorbing material to force liquid therefrom.

12. An apparatus as set forth in claim 5 wherein said control means includes; a liquid-operated pilot valve having open and closed positions for allowing liquid to flow from said source to said spray means when in said open position, a liquid-operated means for activating said drying means, and valve means disposed at each respective end of the movable roller of said first pair of rollers for actuation from a closed position to an open position when either end of said last-mentioned movable roller moves away from the other of said first pair of rollers to allow liquid from said source to flow to said liquid-operated means for activating said drying means and to flow to said pilot valve to move same to said open position.

13. An apparatus as set forth in claim 12 including; an orificed liquid outlet in liquid communication with liquid trapped between said valve means and said pilot valve when said valve means is in the closed position for causing said pilot valve to remain in the open position a first predetermined period of time after said valve means have been moved to the closed position.

14. An apparatus as set forth in claim 13 wherein; said liquid-operated means for activating said drying means has an orifice to reduce liquid flow therefrom to said orificed liquid outlet when said valve means is in the closed position so that said drying means remains activated a second predetermined period of time after said valve means moves to the closed position.

15. An apparatus of the type utilized to wash automobile floor mats comprising: a housing; means for moving a sheet of material through said housing including, a first pair of rollers mounted in said housing for rotational contact with one another and one of said rollers being movable away from the other as a sheet of material moves therebetween, a second pair of rollers mounted in said housing for rotational contact with one another and one of said rollers being movable away from the other as a sheet of material moves therebetween, a third pair of rollers mounted in said housing for rotational contact with one another and one of said rollers being movable away from the other as a sheet of material moves therebetween, a drive means mounted in said housing for rotatably driving the respective non-movable roller of each of said pairs of rollers; means for guiding a sheet of material through said housing including, a perforated surface extending from said first pair of rollers to said second pair of rollers, a first surface inclined upward from said second pair of rollers to said third pair of rollers; spray means for spraying a liquid on a sheet of material as it passes over said perforated surface; means mounted in said housing between said first and second pair of rollers adjacent said perforated surface for scrubbing a sheet of material as it passes thereover including, an elongated rotary scrub brush rotatably mounted in said housing; means operatively connecting said scrub brush to said drive means for rotating same; drying means mounted in said housing for drying a sheet of material as it passes over said first surface including, a blower mounted on said housing for blowing air against a sheet of material as it passes over said first surface; a source of liquid; and control means including, a liquid operated pilot valve having open and closed positions for allowing liquid to flow from said source to said spray means when in said open position, a liquid-operated means for activating said blower, and valve means disposed at each respective end of the movable roller of said first pair of rollers for actuation when either end of said last-mentioned movable roller moves away from the other of said first pair of rollers to allow liquid from said source to flow to said liquid operated means for activating said blower and to flow to said pilot valve to move same to said open position.

16. An apparatus of the type utilized to wash automobile floor mats comprising: a housing; means for moving a mat through said housing including, a first roller rotatably mounted in said housing, a second roller rotatably mounted in said housing for rotational contact therealong with said first roller so as to rotate therewith, said second roller being mounted for movement toward and away from said first roller to allow a mat to pass therebetween, said second roller being biased toward said first roller, a third roller rotatably mounted in said housing, a fourth roller rotatably mounted in said housing for rotational contact therealong with said third roller so as to rotate therewith, said fourth roller being mounted for movement toward and away from said third roller to allow a mat to pass therebetween, said fourth roller being biased toward said third roller, a fifth roller rotatably mounted in said housing, a sixth roller rotatably mounted in said housing for rotational contact therealong with said fifth roller so as to rotate therewith, said sixth roller being mounted for movement toward and away from said fifth roller to allow a mat to pass therebetween, said sixth roller being biased toward said fifth roller, a drive means mounted in said housing for rotatably driving said first, third and fifth rollers; means for guiding a mat through said housing including, a perforated surface extending from said first and second rollers to said third and fourth rollers, a first surface inclined upward from said third and fourth rollers to said fifth and sixth rollers; spray means for spraying a liquid on a mat as it passes over said perforated surface; scrub means mounted in said housing adjacent said perforated surface for scrubbing a mat as it passes thereover including, an elongated rotary scrub brush rotatably mounted in said housing; means operatively connecting said scrub brush to said drive means for rotating same; drying means mounted in said housing for drying a mat as it passes over said first surface including, a blower mounted on said housing for blowing air against a mat; a source of liquid; and control means including, valve means disposed at each respective end of said second roller for actuation to allow liquid to pass therethrough when either respective end of said second roller moves away from said first roller, said source of liquid being in liquid communication with said valve means, a pilot valve, said pilot valve being in liquid communication with said source, said valve means, and said spray means respectively, said pilot valve being operable to an open position by liquid from said valve means to allow liquid to flow from said source to said spray means, and means in liquid communication with said valve means for activating said blower by liquid from said valve means.

17. An apparatus as set forth in claim 16 including means for heating and dehydrating air as it passes to said blower.

18. An apparatus as set forth in claim 16 including; a depository in said housing, a second surface disposed between said fifth and sixth rollers and said depository for guiding a mat to said depository so that a mat of predetermined length will fold back and forth upon itself in said depository, said housing having an inlet for placing a mat in position to contact said first and second rollers, said housing having an outlet to provide access to said depository, and said inlet and said outlet being positioned on the same side of said housing.

19. An apparatus as set forth in claim 18 including; an air inlet passage for said blower, tubing disposed in said inlet passage, said source of liquid being heated, and said source being in liquid communication with said pilot valve so that liquid flows from said source through said tubing to said spray means so that air passing to said blower through said inlet will be heated and dehydrated.

20. An apparatus as set forth in claim 19 including; an orificed liquid outlet in liquid communication with said liquid passing from said valve means to said pilot valve for causing said pilot valve to remain in said open position a first predetermined period of time after said valve means have been deactivated.

21. An apparatus as set forth in claim 20 wherein; said means in liquid communication with said valve means for activating said blower has an orifice to reduce liquid flow therefrom to said orificed liquid outlet so that said blower remains activated a second predetermined period of time after said valve means has been deactivated.

22. An apparatus as set forth in claim 21 wherein; said fifth roller has a liquid absorbing material thereabout.

23. An apparatus as set forth in claim 22 including; a squeegee roller rotatably mounted in said housing for rotational contact therealong with said sixth roller for compressing said liquid absorbing material to force liquid therefrom.

24. An apparatus as set forth in claim 23 including; a tank disposed beneath said perforated surface for catching liquid, and a drain means connected in liquid communication with said tank for removing liquid therefrom.

25. An apparatus of the type utilized to wash automobile floor mats comprising: means for moving a mat through sad apparatus; spray means mounted in said apparatus for spraying a liquid on a mat as it passes through said apparatus; means mounted in said apparatus for scrubbing a mat; drying means mounted in said apparatus for drying a mat after the mat has been sprayed and scrubbed; a source of liquid; and control means for allowing a liquid from said source to be sprayed for a predetermined period by said spray means when a mat first contacts said means for moving a mat and means for activating said drying means.

26. An apparatus of the type set forth in claim 25 including an inlet for receiving a mat and an outlet for removing a mat therefrom, said inlet and said outlet being disposed on the same side of said apparatus so that an operator may insert a mat into the apparatus and remove a mat from the apparatus while remaining in substantially the same position.

27. An apparatus of the type set forth in claim 25 wherein said control means includes a liquid-operated pilot valve having open and closed positions for allowing liquid to flow from said source to said spray means when in said open position and a solenoid operated valve actuable between open and closed positions to allow liquid from said source to flow therethrough when in said open position to open said pilot valve.

28. An apparatus of the type set forth in claim 27 wherein said control means further includes an electrical power source, a first switch connected to said power source and having open and closed positions for activating said drying means when in the closed position, and switch means connected to said power source for actuating said solenoid operated valve to the open position when a mat first contacts said means for moving a mat.

29. An apparatus of the type set forth in claim 25 wherein said spray means includes a first spray tube for spraying liquid on a mat upstream of said means for scrubbing a mat and a second spray tube for spraying liquid on a mat downstream of said means for scrubbing a mat, and detergent means in communication with said first tube for adding detergent to the liquid sprayed on a mat upstream of said means for scrubbing a mat.

30. An apparatus of the type set forth in claim 29 wherein said detergent means includes a source of detergent, a venturi through which liquid flows to said first tube, said source of detergent being in communication with said venturi whereby detergent is added to the flow of liquid through said venturi.

31. An apparatus as set forth in claim 25 wherein said means for moving a mat includes; a first pair of rollers mounted on said apparatus for rotational contact with one another with one of said rollers being movable away from the other as a mat is moved therebetween, a second pair of rollers mounted in said apparatus for rotational contact with one another with one of said second pair of rollers being movable away from the other as a mat is moved therebetween, a third pair of rollers mounted on said apparatus for rotational contact with one another with one of said third pair of rollers being movable away from the other as a mat is moved therebetween, drive means for rotatably driving the respective non-movable rollers of each of said pairs of rollers, and means for guiding a mat from said first pair of rollers to said second pair of rollers and from said second pair of rollers to said third pair of rollers; and wherein said means for scrubbing a mat is mounted in said apparatus between said first and second pair of rollers, means operatively connecting the scrubbing means to said drive means; and wherein said spray means includes a first tube for spraying liquid on a mat upstream of the scrubbing means and a second tube for spraying liquid on a mat downstream of the scrubbing means; and wherein said drying means is disposed to dry a mat as the mat moves from said second to said third pair of rollers; and wherein said control means includes a liquid-operated pilot valve having open and closed positions for allowing liquid to flow from said source and to said first and second tubes when in said open position, a solenoid operated valve actuable between open and closed positions to allow liquid from said source to flow therethrough when in said open position to open said pilot valve, an electrical power source, a first switch connected to said power source and having open and closed positions for activating said drying means when in said closed position, and switch means connected to said power source and actuated by the movable roller of said first pair of rollers for actuating said solenoid operated valve to the open position when a mat passes between said first pair of rollers.

32. An apparatus as set forth in claim 31 including detergent means in communication with said first tube for adding detergent to the liquid sprayed therefrom.

33. An apparatus as set forth in claim 31 including an orificed liquid outlet in communication with said solenoid operated valve and said pilot valve to maintain said pilot valve open a predetermined period after a mat first contacts said first pair of rollers.

References Cited
UNITED STATES PATENTS

| | | | |
|---|---|---|---|
| 1,930,575 | 10/1933 | Wynd et al. | 15—308 X |
| 2,169,754 | 8/1939 | Beyster | 15—77 X |
| 2,382,089 | 8/1945 | Morgenstern | 15—77 X |
| 2,788,009 | 4/1957 | Lonas. | |
| 2,971,208 | 2/1961 | Moore et al. | 15—77 X |
| 2,986,149 | 5/1961 | Van Brakel. | |

ROBERT W. MITCHELL, *Primary Examiner.*